(12) United States Patent
Manser

(10) Patent No.: US 9,276,774 B2
(45) Date of Patent: Mar. 1, 2016

(54) VISUALIZING AND MODIFYING AD-HOC NETWORK NODES

(75) Inventor: David B. Manser, Brea, CA (US)

(73) Assignee: The Boeing Company, Chicago, IL (US)

(*) Notice: Subject to any disclaimer, the term of this patent is extended or adjusted under 35 U.S.C. 154(b) by 1766 days.

(21) Appl. No.: 11/511,885

(22) Filed: Aug. 29, 2006

(65) Prior Publication Data

US 2008/0056223 A1    Mar. 6, 2008

(51) Int. Cl.
*H04W 4/00* (2009.01)
*H04L 12/66* (2006.01)

(52) U.S. Cl.
CPC ..................... *H04L 12/66* (2013.01)

(58) Field of Classification Search
CPC ........ H04L 12/66; H04L 41/12; H04W 24/00
See application file for complete search history.

(56) References Cited

U.S. PATENT DOCUMENTS

| | | | |
|---|---|---|---|
| 5,889,954 A * | 3/1999 | Gessel et al. | 709/223 |
| 6,754,230 B2 | 6/2004 | Purpura et al. | |
| 6,801,764 B2 | 10/2004 | Purpura | |
| 6,980,546 B2 | 12/2005 | Purpura et al. | |
| 2003/0076785 A1 | 4/2003 | Purpura | |
| 2004/0174822 A1* | 9/2004 | Bui | 370/252 |
| 2004/0228304 A1 | 11/2004 | Riedel et al. | 370/332 |
| 2005/0090201 A1* | 4/2005 | Lengies et al. | 455/41.2 |
| 2005/0131933 A1* | 6/2005 | Jha | 707/102 |
| 2006/0136721 A1* | 6/2006 | Bruestle et al. | 713/168 |
| 2006/0153099 A1 | 7/2006 | Feldman et al. | 370/254 |
| 2007/0201411 A1* | 8/2007 | Behroozi | 370/338 |
| 2007/0280165 A1* | 12/2007 | Doshi et al. | 370/331 |
| 2007/0298805 A1* | 12/2007 | Basak et al. | 455/446 |

OTHER PUBLICATIONS

U.S. Appl. No. 11/367,240, filed Mar. 3, 2006, Purpura.

* cited by examiner

*Primary Examiner* — Ajit Patel

(57) ABSTRACT

A method of managing a network including a plurality of nodes. The nodes are displayed, in a pictorial display, relative to a current geographic location of the nodes. The method includes modifying, via the display and via the network, one or more capabilities of one of the nodes. The node is an ad-hoc node. This method can improve network management flexibility, asset utilization, resource sharing, and load leveling.

39 Claims, 8 Drawing Sheets

| Level | Interoperability Capability | | |
|---|---|---|---|
| | Representation | a | Agent |
| 4 | Coordination | c | Planning / Tasking |
| | | b | Workflow |
| | | a | Resource Mgmt |
| 3 | Contribution | b | Utility Computing |
| | | a | Web Services |
| 2 | Interaction | c | Dissemination |
| | | b | Distributed Processing |
| | | a | Web-based Apps |
| 1 | Transfer | e | Video / Voice over IP |
| | | d | Instant Messaging |
| | | c | E-mail |
| | | b | File Transfer |
| | | a | Hypermedia (HTTP) |

—100

VISUALIZING AND MODIFYING AD-HOC NETWORK NODES

CROSS-REFERENCE TO RELATED APPLICATIONS

This application is related to U.S. patent application Ser. No. 11/511,890 entitled "Visualization of Ad-Hoc Network Nodes" and filed on the same day as this application. The disclosure of the above application is incorporated herein by reference.

FIELD

The present disclosure relates generally to communication networks and more particularly (but not exclusively) to representing ad-hoc network nodes, their capabilities, their consumption of network services, and their geographic locations in a display.

BACKGROUND

The statements in this section merely provide background information related to the present disclosure and may not constitute prior art.

In military network-centric operations (NCO), it is highly desirable for communications and/or weapon systems to perform effectively under difficult conditions, and particularly under battle conditions. Mobile ad hoc networks (MANETs) can be extremely flexible and are often characterized by a significant amount of mobility and geographical movement. Because MANET nodes are mobile, however, the topology of a MANET network may change quickly and unpredictably. It can be extremely difficult to visualize trends and to spot potential trouble in a MANET in real time. Planning and management of mobile ad-hoc networks becomes even more complicated for a network-of-networks, in which a plurality of different network systems may be used.

SUMMARY

The present disclosure, in some implementations, is directed to a method of managing a network including a plurality of nodes. The nodes are displayed, in a pictorial display, relative to a current geographic location of the nodes. The method includes modifying, via the display and via the network, one or more capabilities of one of the nodes. The one of the nodes is an ad-hoc node.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION OF THE PREFERRED EMBODIMENTS

The following description is merely exemplary in nature and is not intended to limit the present disclosure, application, or uses.

Although various implementations of the present disclosure are described with reference to network-centric operations (NCO) and military applications, the disclosure is not so limited. The disclosure may be implemented relative to many different networks and network-centric environments, including but not limited to various enterprise systems and non-military applications. Further, the disclosure may be implemented in relation to networks including nodes other than or in addition to mobile ad-hoc nodes. Thus the disclosure can be implemented in relation to various networks including stationary nodes and/or mobile (but not necessarily ad-hoc) nodes. Additionally, although implementations of the disclosure are described with reference to a testing, planning and demonstration environment, the disclosure is not so limited. Implementations also are contemplated in relation to networks which are not included in a testing environment.

Figure 1:
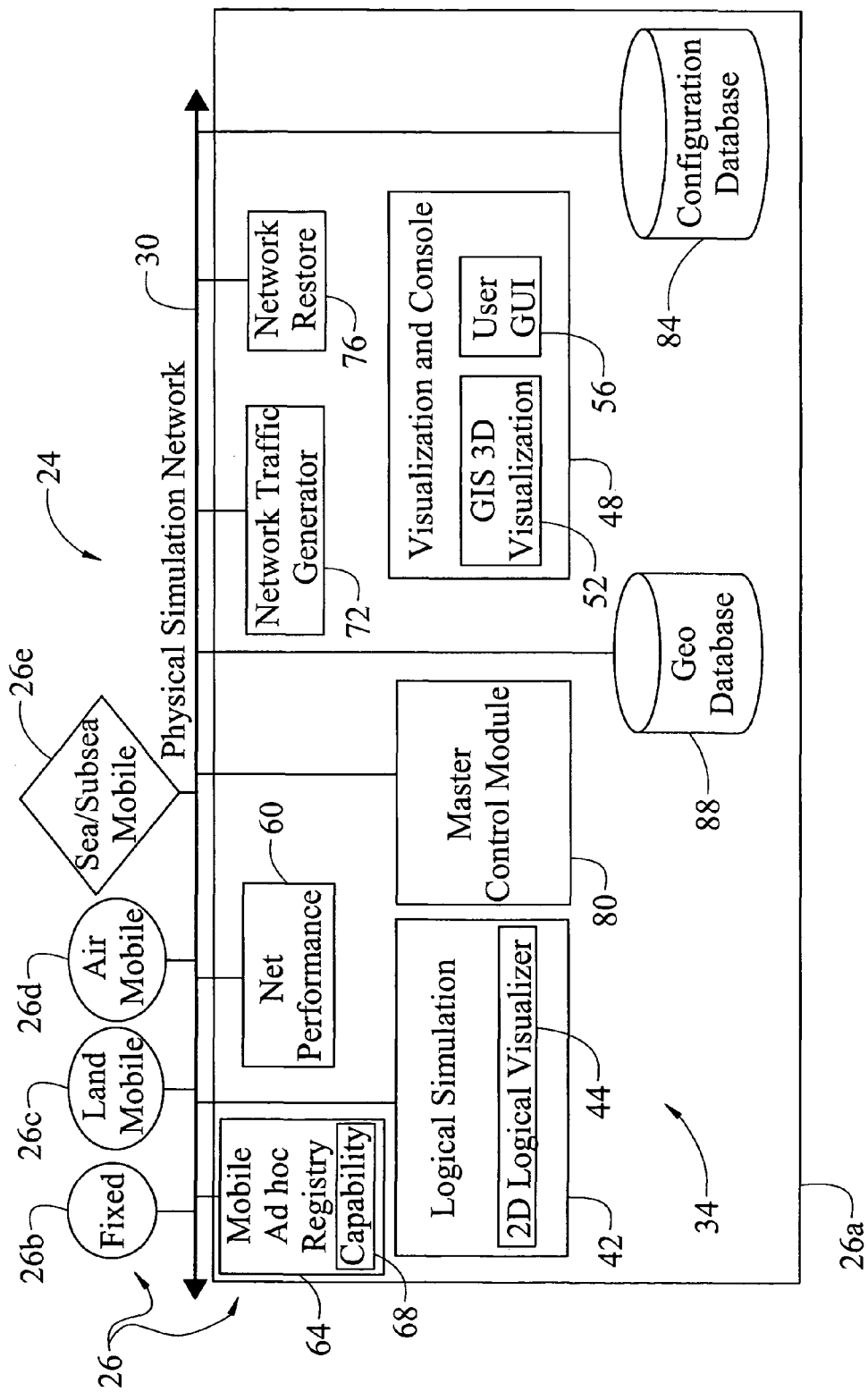
FIG. 1 is a diagram of a system for managing a communications network in accordance with some implementations of the present disclosure.

A system for managing a communications network in accordance with some implementations of the present disclosure is indicated by reference number 20 in FIG. 1. The system 20 is used for managing a communications network indicated generally by reference number 24. The network 24 includes a plurality of nodes 26, one of which is referred to as 26a and includes the management system 20. In the present exemplary configuration, the network 24 includes a physical simulation network 30 that may be used to plan, test and/or demonstrate various systems for a typical battle space at a plurality of levels. The simulation network 30 may be, e.g., LabNet by Boeing. Nodes 26 also may together form one or more networks, and in such cases the network 24 may be referred to as a network-of-networks. A given node 26 of the network 24 may be real (i.e., live), virtual or constructive. A real or live node may be formed when a human operates hardware, e.g., when a soldier operates a wireless telephone. A virtual node is formed, e.g., when a human operating a workstation controls software to emulate a live node. A constructive node is formed, e.g., when a live node is emulated entirely by software execution as further described below.

The nodes 26 may be fixed, mobile and/or ad-hoc nodes. Communication between mobile nodes in a battle space typically relies on terrestrial and/or air/space, wired and/or wireless communication modes using equipment such as radios, radio systems, beyond-line-of-sight terminals, satellites, routers, relays and/or switches for the transport of data bits from one user platform (i.e., end node) to another. Exemplary nodes 26 of the network 24 include fixed nodes 26b, land mobile nodes 26c, and air mobile nodes 26d. Nodes 26 also include sea/sub-sea nodes 26e, which in the present configuration are live nodes. It should be understood that other or additional types of nodes may be included in the network 24 and managed in accordance with implementations of the disclosure.

The network 24 may include, in addition to the network 30, other real physical network(s) which may include real routers, real network management system(s), and live nodes. The network 24 also may include one or more distributed simulation systems which may be used, as further described below, to represent various real and virtual nodes, and constructive nodes modeled in real time by the system 20, on real physical network(s).

The management system 20 may be used to manage the real network 30, e.g., while simultaneously managing a simulated network and/or network-of-networks that are part of a war game, experiment, exercise or demonstration that involves virtual nodes. The system 20 can be used to manipulate the network 24 to detect and address less-than-perfect communication from a variety of simulated effects, e.g., terrain, weather, actions of adversaries, and/or unintended misconfiguration of the network 24.

The management system 20 can be used, e.g., for health management of the network 24. In some implementations and as further described below, network health and status of live and virtual nodes 26 of a mobile ad-hoc network (MANET) may be dynamically displayed on a geographical background at a user-selected display scale. In some implementations, the management system 20 may be used to protect the network 24 against various types of system attacks, including but not limited to viruses, Trojans, worms, polymorphic worms, and spam. In some implementations, an attack generator may be used for purposes of testing and/or demonstrations. In the exemplary system 20 shown in FIG. 1, a network traffic generator subsystem may be used to generate a denial-of-service (DOS) attack in the network 24 or a sub-network thereof. As further described below, a network restore subsystem can detect the DOS attack, filter packets causing the denial of service, and restore the affected network to its normal operating bandwidth.

Net-centric interoperability of live and virtual nodes 26 can be provided, where live nodes 26 register with a mobile ad-hoc registry (further described below) to announce level(s) of interoperability possessed by the nodes 26. The management system 20 includes a plurality of subsystems 34 configured with hardware and/or software for performing various functions relative to network nodes 26 (e.g., routers, switches, live nodes, virtual nodes, constructive nodes, etc.) managed by the system 20. A logical simulation subsystem 42 includes a 2-D logical visualizer 44. A visualization subsystem 48 includes a geo-spatial information subsystem (GIS) 3-D visualization module 52 and a user GUI (graphical user interface) subsystem 56. The subsystem 48 is configured to provide a visualization of nodes 26 of the network 24 on a geographical background. The user GUI subsystem 56 is configured to allow a user to interact with the visualization and with the management system 20.

A network performance subsystem 60 is configured to monitor health and performance of the network 24. A mobile ad-hoc registry subsystem 64 is configured to register nodes 26 joining the network 24 and to record, in a registry 68, levels of interoperability of a node 26 and capabilities of applications available on a node 26.

A network traffic generator subsystem 72 is configured to generate real network traffic to selected segment(s) of the network 24. A network restore subsystem 76 is configured to detect a network traffic problem and restore network communication. A master control module 80 is configured to determine data flow and protocol(s) of data transfer among subsystems 34. The system 20 may obtain data pertaining to network health of the network 24 at predefined time(s) and for location(s) of various nodes of the network 24. Such health data may be stored in a configuration database 84. Initial configuration data for various tools of the management system 20, including but not limited to configuration data for the subsystems 34, may also be stored in the configuration database 84. A GIS database subsystem 88 is configured to store digital terrain elevation data (DTED) and imagery data.

During operation of the system 20, the network performance, mobile ad-hoc registry, network traffic generator, and network restore subsystems 60, 64, 72, and 76 are included in the management system virtual node 26a which communicates with the physical network 30. The management system 20 multicasts entity state protocol data units (PDUs) to the physical simulation network 30. In such manner, the system 20 can send control information to a selected node 26 as further described below. Various subsystems 34 shall now be described in greater detail.

Logical Simulation Subsystem

The logical simulation subsystem 42 acts as a central logical simulation subsystem, e.g., for common planning using the management system 20. The logical simulation subsystem 42 models constructive nodes and simulates live, virtual, and constructive nodes 26 on the physical network 30. The logical simulation subsystem 42 includes one or more application programming interfaces (APIS) for interfacing with source data coming to it in protocol, which may include but are not necessarily limited to distributed interactive simulation (DIS), higher-language architecture (HLA), and real data. A DIS interface listens for DIS entity state data through a port. A HLA interface listens for HLA entity state data through a different port. An IP network emulator (IPNE) interface intercepts real data before forwarding it to an appropriate IP address on the physical network 30.

The logical simulation subsystem 42 receives data from various sources and protocols, e.g., for use in illustrating a scenario to be demonstrated. The subsystem 42 receives precise participant location and identification information (PPLI) entity state data from nodes 26 via DIS protocol. PPLI entity state data is also received from container nodes for the subsystems 68, 60, 72 and 76. The logical simulation subsystem 42 also receives real data from each node 26 being simulated and from the system 20 virtual node 26a. The logical simulation subsystem 42 forwards real data to target node(s) on the physical simulation network 30.

The logical simulation subsystem 42 models constructive nodes using a variety of models, including but limited to antennae, radios, routers, switches, relays, etc. Such constructive nodes can number in the thousands and can be modeled in essentially real time. The logical simulation subsystem 42 can simulate live, virtual, and constructive nodes on the physical simulation network 30. Data pertaining to line of sight (LOS), power and range between two nodes 26 is received in the logical simulation subsystem 42. LOS calculations are performed in the visualization subsystem 48, although in some implementations, calculation of line-of-sight (LOS) may be performed in the logical simulation subsystem 42.

When the logical simulation subsystem 42 completes logical modeling for a node 26, the subsystem 42 outputs node data to the visualization subsystem 48 via the master control module 80. Input and output data for the logical simulation subsystem 42 are shown in Table 1.

TABLE 1

Logical Simulation Subsystem Input and Output Data

| Data type | Data | From | To |
|---|---|---|---|
| Input | PPLI entity state data in DIS protocol | Live, virtual, nodes on the physical network, constructive nodes inside Logical Simulation, and container nodes containing Mobile Ad hoc Registry, Network Performance, Network Traffic Generator, Network Restore subsystems | Logical simulation subsystem |
| Input | Real traffic data that comes from container nodes or emulators to be simulated: NIS packets from Network Performance Subsystem, Traffic packets from Network Traffic Generator, Node Capability data from Mobile Ad hoc Registry | Network Performance Subsystem, Traffic Generator Subsystem, Mobile Ad hoc Registry, Network Restore Subsystem | Logical simulation subsystem |
| Input | Time ticks | Master Control module | Logical simulation subsystem |
| Output | Node data for LOS and path loss calculation | Logical simulation subsystem | Master Control Module |
| Output | Node location data for display for one, two, or all nodes, time T (no link data) | Logical simulation subsystem (regular data format) | Master Control Module |

Visualization Subsystem

The visualization subsystem 48 is configured for the display of scenarios to demonstrate network activities of nodes 26 on the physical simulation network 30, e.g., from a time 0 (beginning) to a user-selected time T (end). Various types of data may be visualized, including but not limited to location data for one, two, or more nodes 26, e.g., in DIS format or real format at time T. Link data between nodes of similar communication subsystem type at time T may also be visualized. Alternatively or additionally, and as further described below, applications capability(s) of a node 26 and/or interoperability information, including a level of interoperability of a node 26, may be visualized. Network health data for the network 24 may also be shown using the visualization subsystem 48.

The visualization subsystem 48 receives location data from the logical simulation subsystem 42, or through the master control module 80, to display 2-D and/or 3-D views of the network 24. A 2-D view may represent a functional topology of the network 24, including a network health management representation. A 3-D view may include a geographical background and/or interoperability levels and/or application capabilities of the node(s) 26. The visualization subsystem 48 queries the mobile ad-hoc registry subsystem 64 for node interoperability levels and application capabilities.

Network health data can come to the visualization subsystem 60 via notification and/or request. The master control module 80 may query the network performance module 60 for the latest network health data, or may request to be notified if a network issue is detected at a node 26 or on a path on the network 24.

The visualization subsystem 48 displays a 3D geographic background that can cover all node 26 locations. Such a background may be provided from beginning to end of a demonstration via the system 20. An icon for each node 26 is displayed on top of the geographical background at an appropriate moving speed. The visualization subsystem 48 displays potential lines of communication between assets of the network 24 which are capable of communicating with one another. Various levels of network performance may be differentiated, e.g., by a color coding scheme (green, yellow, and red) in 2-D. The visualization subsystem 48 displays an interoperability level for a node 26 when requested by a user of the system 20. The visualization subsystem 48 provides for human interaction with the system 20 through the user GUI subsystem 56. For example, a mouse hover may be activated to display details as to a node, or the user may right-click to select displayable attributes of a node.

As further described below, the visualization subsystem 48 provides a capability to pan, zoom in, and/or zoom out. Various specialized looks for a view may be available to a user through various on-screen "buttons" displayed by the GUI subsystem 56.

The visualization subsystem 48 identifies a node and/or a path between two nodes relative to which a network health issue is detected, e.g., when a network health measure exceeds or falls below a threshold level or there is loss of communication. The visualization subsystem 48 may zoom automatically to such a trouble spot.

The visualization module 48 may be implemented using a programmer-enhanced COTS base. Such COTS tool may be, e.g., ESRI or Arc Engine™ on Windows platform, with programming languages Visual C++ or VB. The geographical database 88 may be, e.g., a personal geographic database (Microsoft® Access). In some implementations, ArcSDE™ may be used to act as a gateway into an Oracle® database and geographic files. Geographic data may also be provided in real time via ArcWebServices™. ESRI includes three protocol options for receiving input location data: DIS data from the physical network 30, regular data through sockets of the logical simulation subsystem 42, and Tracking Server™ in the visualization module 48.

Request and return of interoperability data from the mobile ad-hoc registry subsystem 64 is performed via socket protocol. Request and return of network health data from the network performance subsystem 60 is performed via SNMP protocol. Notification when new network health data is available from the network performance subsystem 60, or when a defined network health problem is detected, occurs via SNMP interface. When such event occurs, the visualization subsystem 48 can call procedure(s) in the network performance subsystem 60 to get network health data for all network nodes or for a problematic node and/or path. When a communications (COMM) link is lost, a database trigger may call a pop-up window to display a loss of COMM link notification to the visualization subsystem 48, and invoke red-lining properties of the visualization subsystem 48 to zoom to the trouble node(s). Input and output data for the visualization subsystem 48 are shown in Table 2.

TABLE 2

Visualization Subsystem Input and Output Data

| Data type | Data | From | To |
|---|---|---|---|
| Input | Node data for display (Node ID, node location attributes), timestamp | Logical Simulation Subsystem | Visualization subsystem |
| Input | Link data between two nodes (node IDs, path loss calculation, LOS) | Master Control Module | Visualization Subsystem |
| Output | Request for interoperability level | Visualization subsystem | Capability Registry |
| Input | Node ID, LIINCO level, application capability | Capability Registry | Visualization subsystem |
| Output | Request to get the latest network health data for one or more nodes | Visualization Subsystem | Network Performance Subsystem |
| Input | Network health data for one node or multiple nodes | Network Performance Subsystem | Visualization Subsystem |
| Input | Notification of network health issue for a path (start node and end node) | Network Performance Subsystem | Visualization Subsystem |
| Output | Slew capability to spot that has network health problem | Visualization Subsystem | Visualization subsystem |
| Input | Notification of loss of COMM link | Configuration database | Visualization subsystem |
| Output | Slew capability to spot that loses COMM link | Visualization Subsystem | Visualization Subsystem |

Network Performance Subsystem

The network performance subsystem 60 provides network health data of the real physical network 30. The subsystem 60 provides a real measure of network performance, thereby rendering as more realistic a demonstration via the system 20. In some implementations, the subsystem 60 employs remote detection and is non-intrusive. In some implementations, network health data may be supplemented by models provided by the logical simulation subsystem 42. Network health monitoring of constructive nodes is modeled in the logical simulation subsystem 42.

The network performance subsystem 60 may act as a single node or as many, because the origins of simultaneous health monitoring path traces can number in the thousands. A database for storing results of the network performance subsystem 60 has its initial PPLI location data sent to the logical simulation subsystem 42 once initially and it can move with planned movement of the network performance subsystem 60 container node. Alternatively, the database could stay at one location.

Data sent out by the network performance subsystem 60 to probe the network 24 passes through the logical simulation subsystem 42 before reaching a node 26 (a live, virtual, or single constructive node) of the physical simulation network 30. Data returned from the physical network 30 also passes through the logical simulation subsystem 42 before reaching the network performance subsystem 60.

The network performance subsystem 60 provides continuous monitoring of the network 24 by running predefined tests to monitor important paths of the physical network 30. A path is defined between a starting node 26 and an end node 26. The network performance subsystem 60 may provide notification through both SNMP interface and database trigger to let the master control module 80 know: (a) when a test is complete; (b) when a threshold level of a given network health measure is reached, signaling a predefined problem; (c) when the network 24 is trending toward sub-optimization, segment failure, or total collapse; and/or (d) when network services have been restored.

The network performance subsystem 60 provides procedures for returning data pertaining to network health measures when requested by a user of the system 20. Network health measures may include, but are not necessarily limited to: percent of packet loss, propagation delay (latency), bandwidth throughput, jitter, and central processing unit (CPU) utilization. Input and output data for the network performance subsystem 60 are shown in Table 3.

TABLE 3

Network Performance Subsystem Input and Output Data

| Data type | Data | From | To |
|---|---|---|---|
| Output | PPLI data of container node | Network Performance Subsystem | Logical Simulation Subsystem |
| Input | Request to get the latest network health (node ID(s) of path) | Master Control Module | Network Performance Subsystem |
| Output | Network health measures corresponding to network | Network Performance Subsystem | Visualization Subsystem |
| Output | Network health measures corresponding to network | Network Performance Subsystem | Configuration database |
| Output | Notification when a test is completed | Network Performance Subsystem | Visualization Subsystem |
| Output | Notification when there is a problem of defined network health measures | Network Performance Subsystem | Visualization Subsystem |

User GUI Subsystem

The user GUI subsystem 56 is used for controlling a graphical user interface (GUI) as further described below. A user may use the GUI, e.g., to activate the network restore subsystem 76 to address degraded network performance. The user may activate the network performance subsystem 60 to start probing to determine network performance. The user may query the configuration database 84 for the latest network health status for the whole network 24. The user may right-click a mouse to select attributes of a node 26 to display. Additionally or alternatively, the user may hover the mouse to display selected attribute values for a node 26.

Input and output data for the user GUI subsystem 56 are shown in Table 4.

TABLE 4

User GUI Subsystem Input and Output Data

| Data type | Data | From | To |
|---|---|---|---|
| Button Push Input | Command "Get BNC tool suite up" | User GUI Subsystem | All Subsystems |
| Button Push Input | Command "Start DoS attack to a server IP address" | User GUI Subsystem | Network Traffic Generator |
| Button Push Input | Command "Start network solution to a server IP address" | User GUI Subsystem | Network Restore Subsystem |
| Button Push Input | Command "Activate a batch Network Performance tests" | User GUI Subsystem | Network Performance Subsystem |
| Button Push Input | Command "Inquire network health from BNC database" | User GUI Subsystem | Configuration database |
| Right Mouse Click | List of all attributes for user to choose to click. | Configuration database | User GUI small window |
| Checks at check box for selectable attributes | Checks | User GUI small window | Configuration database |
| Mouse hover of a node | Values of selected attributes of a node | Configuration database | User GUI small window |

Mobile Ad-Hoc Registry Subsystem

Figure 2:
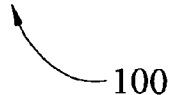
FIG. 2 is a diagram of levels of information interoperability for net-centric operations in accordance with some implementations of the present disclosure.

The mobile ad-hoc registry subsystem 64 includes the registry 68, referred to as a capability registry. One type of capability that may be included in the registry 68 is referred to as a LIINCO level. "LIINCO" is an abbreviation for "levels of information interoperability for network-centric operations". Exemplary LIINCO levels are indicated generally in FIG. 2 by reference number 100. In some implementations, a LIINCO level represents a level of interoperability at which a node is capable of performing in relation to other node(s) in a network. For example, a capability by a node for performing hypermedia transfer is represented in FIG. 2 by a LIINCO level 1*a*. A capability by a node for performing instant messaging is represented by a LIINCO level 1*d*, and so on. The LIINCO levels shown in FIG. 2 represent a plurality of different capabilities that may be utilized in various ways by various nodes.

In some implementations, two or more types of data may be collected from an end node 26 and stored in the registry 68 when the node joins the network 24. Specifically and for example, one or more LIINCO levels and one or more applications capabilities of the node 26 are collected and stored in the registry 68. Applications capabilities may include, e.g., one or more capabilities to meet a mission requirement that the node entity can provide, such as "fire weapons", "track data", and/or "jam network traffic".

The capability registry 68 is connected with the physical network 30. When a node that is equipped with a "capability" client enters the network 24, the node registers its LIINCO level(s) and its application capability(s) in the registry 68. The registry database 68 includes LIINCO and application capability data for all registered nodes 26. It should be noted that in some implementations, other or additional node information and/or criteria could be stored in the registry 68 and used by the management system 20 for displaying and/or modifying nodes 26. It also should be noted that when a node 26 leaves the network 24, the registry 68 may retain the LIINCO and application capability data for that node. Accordingly, the system 20 can recognize and manage such a node if the node subsequently re-enters the network 24, e.g., at a new geographical location.

The mobile ad-hoc registry subsystem 64 sends initial PPLI data for its container node to the logical simulation subsystem 42. When there is a request from the master control module 80 for capability data, the mobile ad-hoc registry subsystem 64 sends the requested data to the master control module 80. Input and output data for the mobile ad-hoc registry subsystem 64 are shown in Table 5.

TABLE 5

Mobile Ad-hoc Registry Subsystem Input and Output Data

| Data type | Data | From | To |
|---|---|---|---|
| Output | PPLI data of container node | Capability Registry | Logical Simulation Subsystem |
| Input | Node ID, LIINCO level(s), application services | A node of the network | Capability registry |
| Input | Node ID | Master Control Module | Capability registry |
| Output | Node ID, LIINCO level(s), application services | Capability registry | Master Control Module |

Network Traffic Generator Subsystem

As previously mentioned, in some testing and/or demonstration environments, some network management system implementations may include attack generators. In the current exemplary system, the network traffic generator subsystem 72, when commanded by the user GUI subsystem 56, generates packets of data of a predefined protocol into the physical network 30. This action causes congestion at certain node(s) of the network 24. Another command from the user GUI 56 may stop the network traffic generator subsystem 72.

The network traffic generator 72 sends initial PPLI data for its container node to the logical simulation subsystem 42. Input and output data for the network traffic generator subsystem 72 are shown in Table 6.

TABLE 6

Network Traffic Generator Subsystem Input and Output Data

| Data type | Data | From | To |
|---|---|---|---|
| Output | PPLI data of container node | Network Traffic Generator | Logical Simulation Subsystem |
| Input | Request to generate packets | User GUI Subsystem | A virtual or constructive node on the physical network |
| Input | Request to stops generation of packets | User GUI Subsystem | A virtual or constructive node on the network |

Network Restore Subsystem

The network restore subsystem 76 starts analyzing traffic going through its server when it receives a request from the user GUI subsystem 56. The network restore subsystem 76 notifies the visualization subsystem 48 when a DoS attack occurs. The network restore subsystem 76 restores the network 24 by routing the packets of DoS attacks to a predetermined server. The network restore subsystem 76 also sends initial PPLI data for its container node to the logical simulation subsystem 42. Input and output data for the network restore subsystem 76 are shown in Table 7.

TABLE 7

Network Restore Subsystem Input and Output Data

| Data type | Data | From | To |
|---|---|---|---|
| Output | Initial PPLI data | Network Restore Subsystem | Logical Simulation Subsystem |
| Input | Request to start monitoring | User GUI Subsystem | Network Restore Subsystem |
| Output | Notifies the Visualization Subsystem of the trouble node(s) | Network Restore Subsystem | Visualization Subsystem |
| Input | Request to restore the network | User GUI Subsystem | Network Restore Subsystem |
| Input | Request to stop monitoring | User GUI Subsystem | Network Restore Subsystem |

A tool for restoring the network 24 after a DoS attack may be, e.g., Cloudshield® by Cloudshield Technologies.

Master Control Module

The master control module 80 may act as the center of the management system 20. The control module 80 may perform tasks (i.e., services) for data traveling between the subsystems 34. The control module 80 also stores reusable components that can be downloaded to subsystems 34 so that the subsystems can perform various tasks in an autonomous manner. Reusable components that can be plugged into other subsystems 34 may include an adapter to translate DIS data to regular data, and an adapter to translate GPS data (received from a live node) to DIS data.

The master control module 80 saves PPLI data for a node 26 at a time T in the configuration database 84. The master control module 80 may calculate line of sight between two nodes and may calculate power/range between two nodes of a specific communication system type. The master control module 80 queries the configuration database 84 for location data for node(s) 26, link(s) between nodes, and network health attributes of node(s). Input and output data for the master control module 80 are shown in Table 8.

TABLE 8

Master Control Module Input and Output Data

| Data type | Data | From | To |
|---|---|---|---|
| Input | PPLI data for a node at time T | Logical Simulation Subsystem | Master Control Module |
| Output | PPLI data for a node at time T | Master Control Module | Configuration database |
| Input | Node location of two nodes at time T | Logical Simulation Subsystem | Master Control Module |
| Output | Line of Sight Flag between two nodes | Master Control Module | Visualization Subsystem |
| Input | Node location of two nodes, communication type | Logical Simulation Subsystem | Master Control Module |
| Output | Power/range data between two nodes | Master Control Module | Visualization Subsystem |
| Visualization Subsystem and Configuration database | Node IDs and COMM determinations of two nodes at time T | Master Control Module | |
| Visualization Subsystem | Node ID(s) | | Master Control Module |
| Visualization Subsystem | Location data, link flag between two nodes, network health attributes | | Configuration database |

Configuration Database Subsystem

The configuration database 84 includes a repository which stores initial configuration data and updated data of entities for a particular demonstration. The database 84 may also contain historical data (e.g., location and/or network health data at a predetermined interval) and/or may record the latest values for data attributes of nodes. Input and output data for the database subsystem 84 are shown in Table 9.

TABLE 9

Database Subsystem Input and Output Data

| Data type | Data | From | To |
|---|---|---|---|
| Output | Notification of loss of COMM link between two nodes | Configuration database (trigger) | Visualization Subsystem |
| Input | Network health measures | Network Performance Subsystem | Configuration database |
| Output | Network health measures | Configuration database | Visualization Subsystem |
| Output | All attribute names for a node | Configuration database | User GUI |
| Output | PPLI data, COMM determination, network health measures, for node(s) at time T | Configuration database | Visualization Subsystem |

Figure 3:
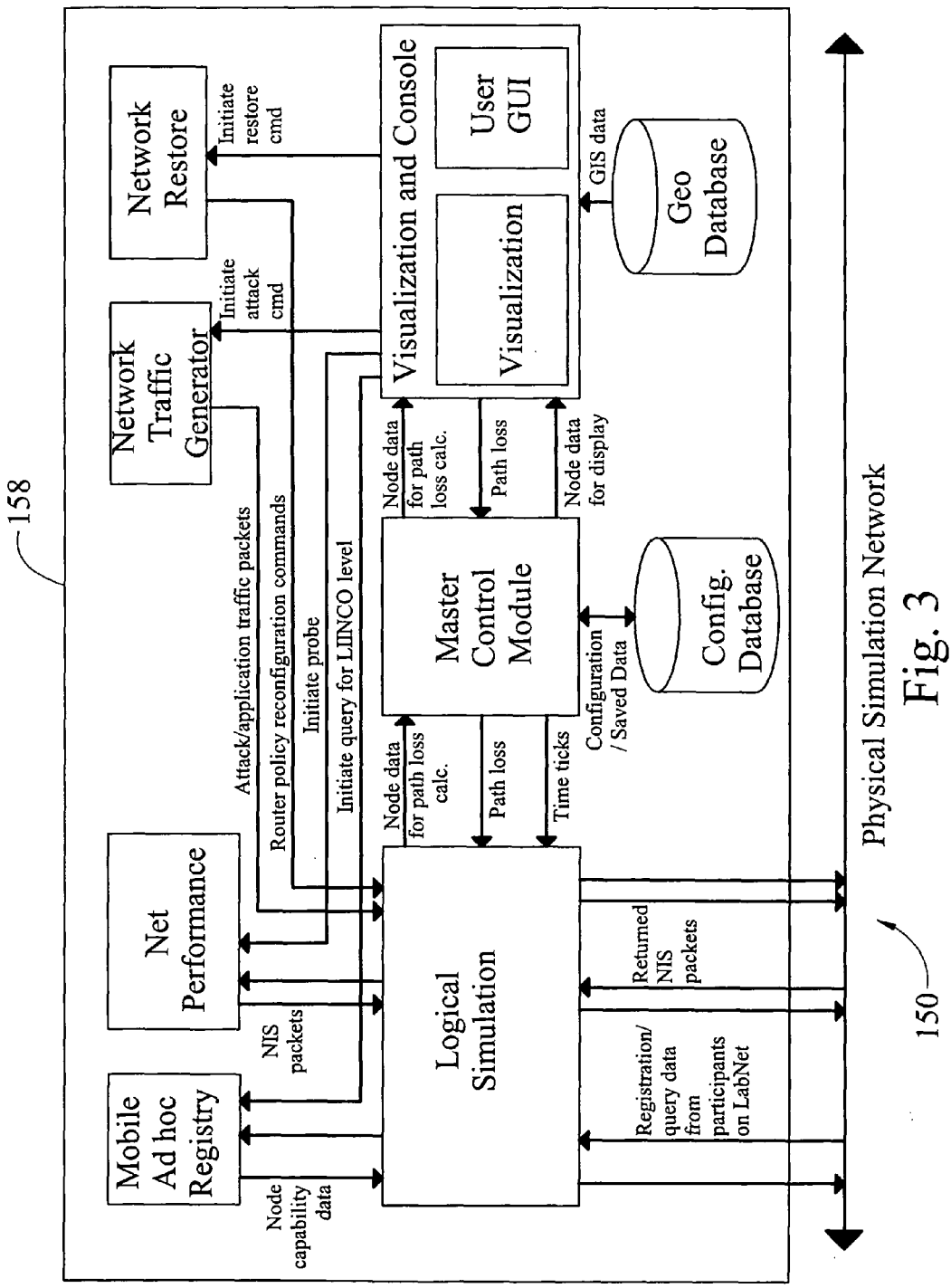
FIG. 3 is a conceptual diagram of various data flows and various data interfaces of a network management system in accordance with one implementation of the disclosure.

A conceptual diagram of one implementation of various data flows and various data interfaces of the management system 20 is indicated generally in FIG. 3 by reference number 150. One or more computers including one or more processors and memory that provide at least part of the management system 20 are indicated collectively by reference number 154. It will be understood by those knowledgeable in the art that many and various configurations of computers, processors, memory, storage devices, communication devices, etc., could be used to implement systems such as the management system 20.

Figure 4:
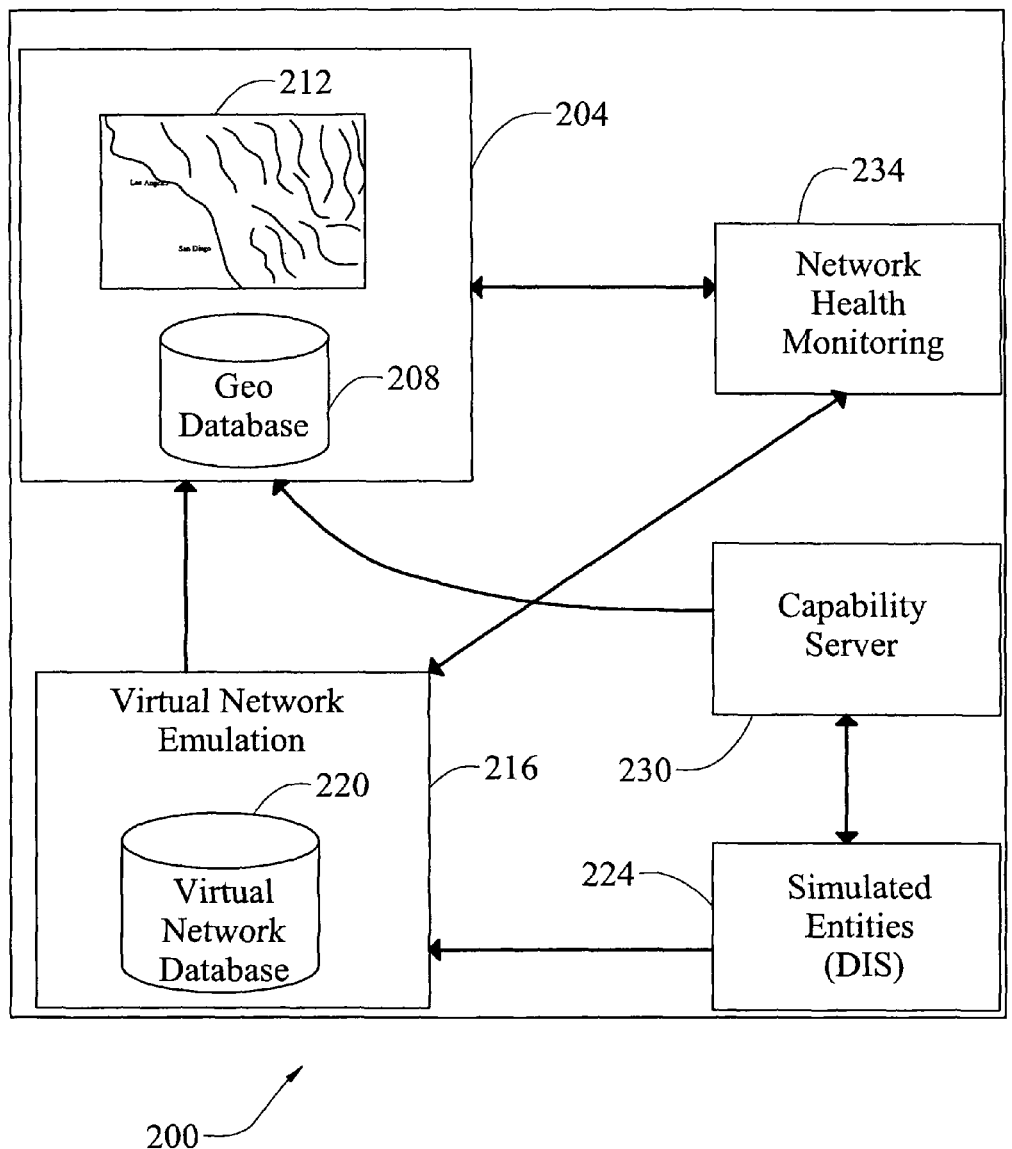
FIG. 4 is a conceptual diagram of various software components of a management system in accordance with one implementation of the disclosure.

A conceptual diagram of one implementation of various software components of the management system 20 is indicated generally in FIG. 4 by reference number 200. A GIS, web-enabled GUI 204 is configured to provide a 3-D GIS-based graphical display and menus. A supporting GIS database 208 is, e.g., SQL-based and may be extended with additional attributes (e.g., rows and/or columns) as desired to contain information specific to the management system 20.

As further described below, the GUI 204 provides a display 212 as well as display menus and tools for manipulating an eye point of a 3-D earth map view (using, e.g., zoom, pan, tilt, etc.). The GUI 204 also makes available means (e.g., buttons) for activating additional services specific to the system 20, which may be linked directly into the display application or launched via a stand-alone separate process.

Network Emulation

Network emulation 216 may be used to provide virtual network device nodes, to augment the physical network 30. Virtual nodes may serve a plurality of purposes, e.g., emulating RF network devices attached to simulated vehicles, and/or shadowing real network 30 nodes 26 desired to be represented in the configuration database 84 (shown in FIG. 1). Communications system data for such uses may be stored in a network emulation database 220.

It should be noted that through the use of network emulation, network device identification and performance data can be joined with geo-location data. For network devices emulated as being attached to mobile assets, geo-location data is provided, e.g., by incoming data from an external vehicle motion simulation via a DIS protocol interface. In such manner, specific network device IDs may be associated with specific DIS entity IDs. Referring to FIG. 1, for virtual nodes acting as shadows of real nodes 26 of the physical simulation network 30, the configuration database 84 may also be used to store values representing the desired fixed geographic locations of such nodes as may be desired for a demonstration scenario. Thus, all network nodes may have a geo-location value (dynamic via DIS, or static) as attributes within the configuration database 84. The logical simulation subsystem 42 can be tasked to perform various analyses of the network 30 and add additional information to the configuration database 84. An API mechanism may be used to export a total set of data to the visualization system 42 for further use, including but not limited to graphical display.

Simulated Entities

Referring to FIG. 4, mobile node assets and host systems (e.g., ground vehicles, aircraft, etc.) to which network devices are attached may be simulated using software 224 and may communicate with other network elements via DIS protocol messages. DIS messages may inform interested receivers as to vehicle identification, location, orientation, and health (e.g., damage).

In some implementations, simulation of mobile systems is primarily constructive. A simulation software framework, e.g., a software program by The Boeing Company, Chicago, Ill., may be used to provide constructive entities. In some implementations, a demonstration configuration may allow the addition of virtual simulation models and live simulation (e.g. surrogate, miniature, etc.) systems where available.

In one implementation, a demonstration network node may host an instance of a capability server 230. The capability server 230 may be used in augmenting simulated entities system(s) 224 to perform registration interactions to populate the capability registry database 68 (shown in FIG. 1). The main application framework for the system 20 may include a capability to request node registry data (e.g., node ID information, applications capability(s), and LIINCO level(s)) from the capability server 230 to add to configuration database 84 content. Capability registry information may be available for selective display by a user as a part of the various attributes of a selected node.

The management system 20 can be used to monitor various network paths and end nodes for connectivity and other performance and health status indications for immediate network commander awareness and visibility to mobile network node issues. In some configurations, a network health monitoring tool 234, e.g., AppCritical by Apparent Networks, may be configured to monitor selected network nodes 26 and generate triggers to initiate notifications of network issues to the configuration database 84.

In Operation

Figure 5:
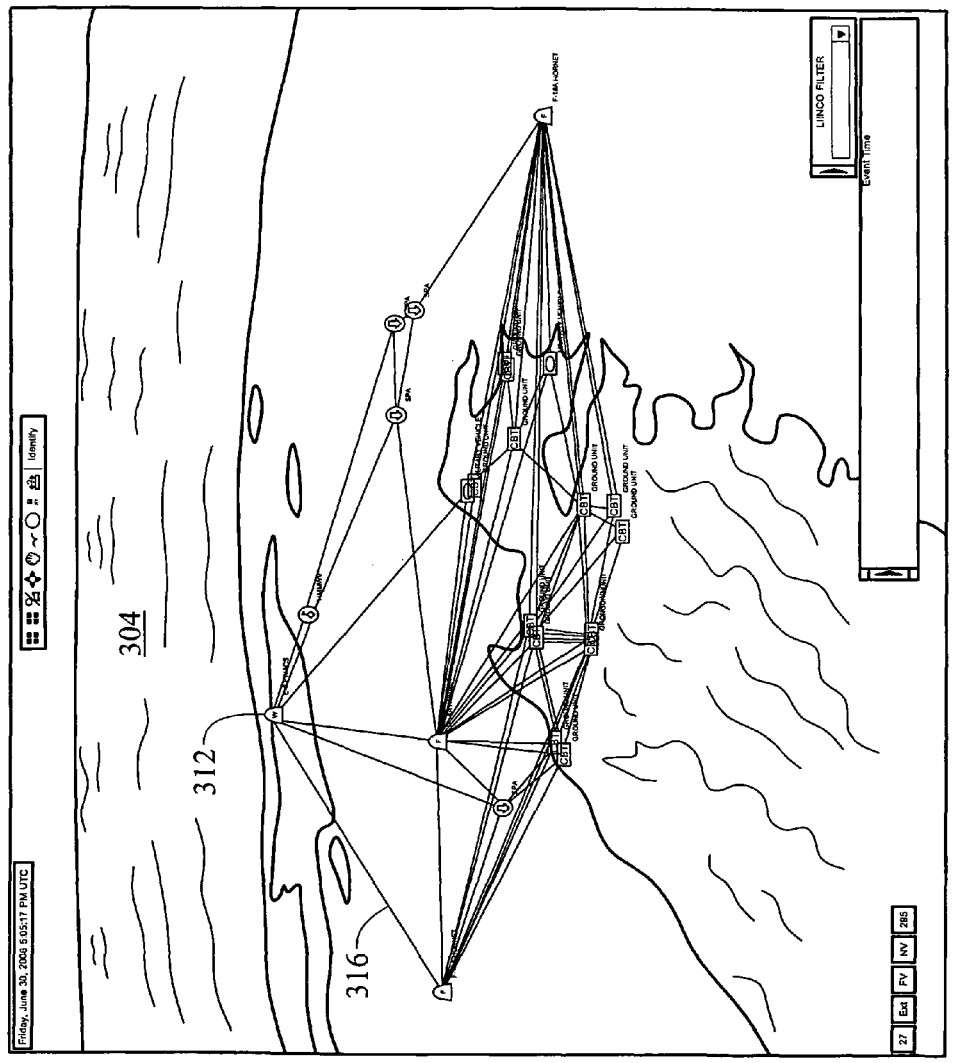
FIGS. 5-8 are views of displays provided via a network management system in accordance with one or more implementations of the disclosure.

When in use, the management system 20 can provide 3-D visualization of a mobile network, for example, as shown in FIG. 5. A display 300 includes a geographical background 304 relative to which a plurality of fixed and mobile network nodes 312 and communication paths 316 between nodes 312 are geo-located in essentially real time. For a node 312 that is "attached" to a mobile system (e.g. Humvee, UAV, ship, fighter, etc.), a symbol for the node may be representative of the vehicle. For nodes such as routers and switches in a fixed location such as within a building, a symbol representing the network device type may be displayed. Various additional attributes such as maximum network capacity, current load, health status, as well as host system geo-location and identification may be selectively displayed by the user. Potential lines of communication between nodes 312 also may be selectively displayed by the user. Such information, for example, may be included in the augmented GIS database and populated by a service retrieving data via an API from an external source (e.g., QualNet by Scalable Network Technologies).

Figure 6:
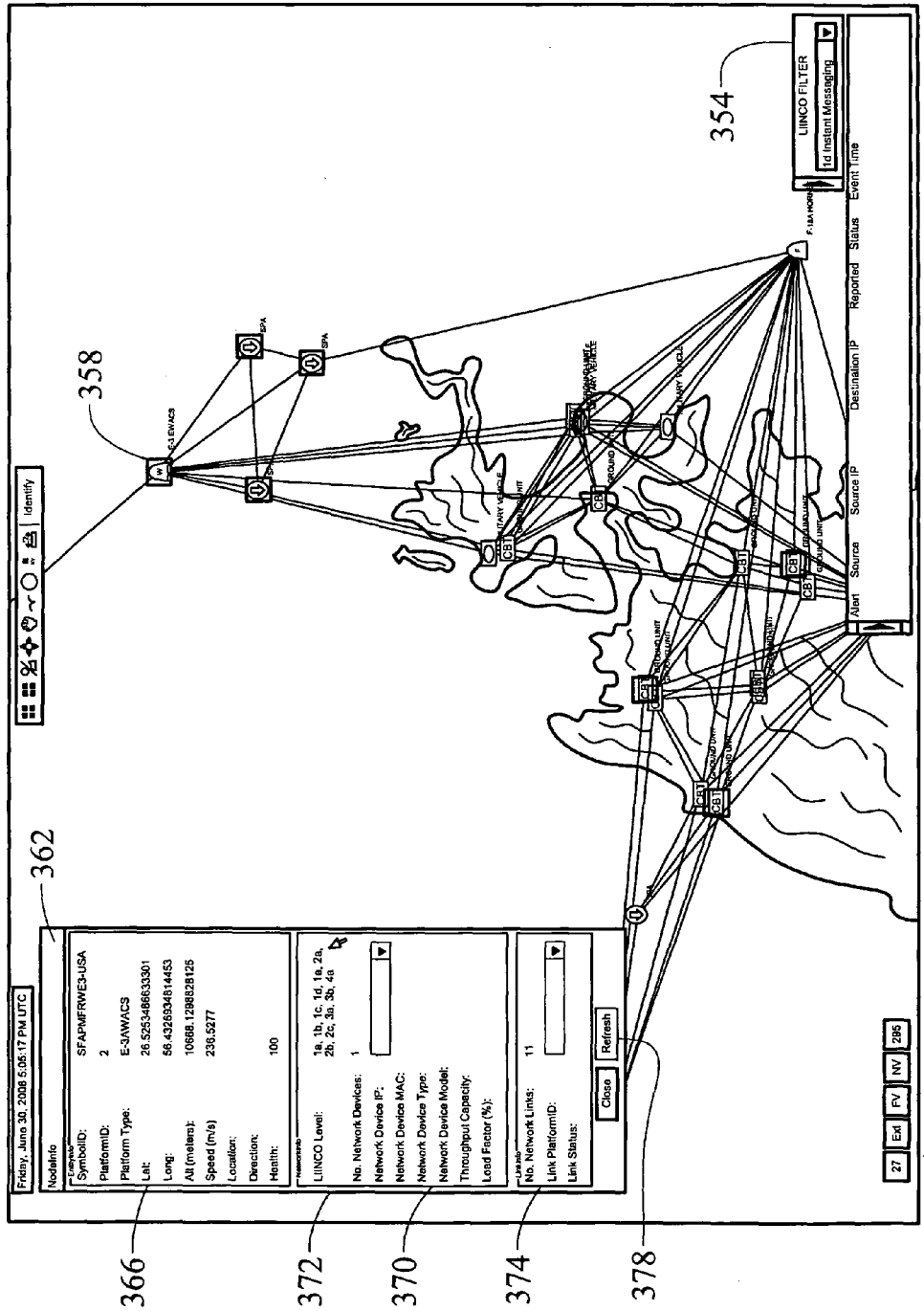

A second display in accordance with one implementation of the disclosure is indicated generally in FIG. 6 by reference number 350. A user of the system 20 may activate a capability filter, e.g., a LIINCO filter 354, to selectively display nodes 312 which meet the selected filter requirement(s). For example, in the display 350, a square symbol 358 is used to indicate those nodes 312 having a LIINCO level indicative of an ability to perform instant messaging.

Information pertaining to a user-selected node 312 is displayed in a window 362. The window 362 can include entity information 366, network information 370 that includes capabilities such as LIINCO levels 372, and link information 374. In another implementation, the window 362 may additionally or alternatively include applications capability(s) of the selected node 312. A refresh button 378 allows the user to refresh the information shown in the window 362 in essentially real time.

Figure 7:
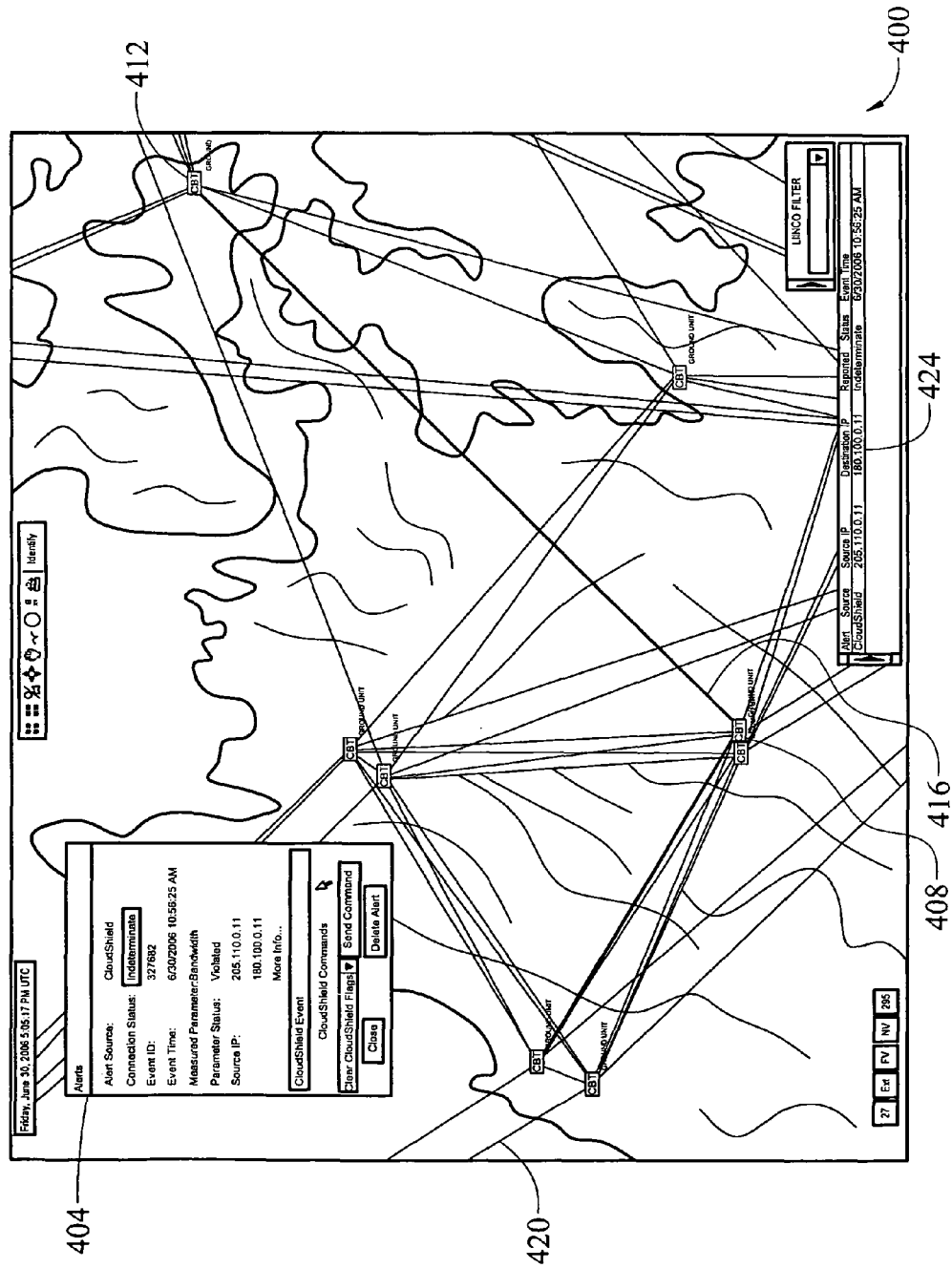

A third display in accordance with one implementation of the disclosure is indicated generally in FIG. 7 by reference number 400. In the display 400, an alert window 404 is displayed to indicate that a DoS event has been detected. The DoS has prevented communication between nodes 408 and 412 over a link 416, which is shown in a color different from a color of functioning links 420. Information as to the status of the link 416 is displayed in a window 424. The alert window 404 allows the user, e.g., to control network restoration and/or delete the alert.

Figure 8:
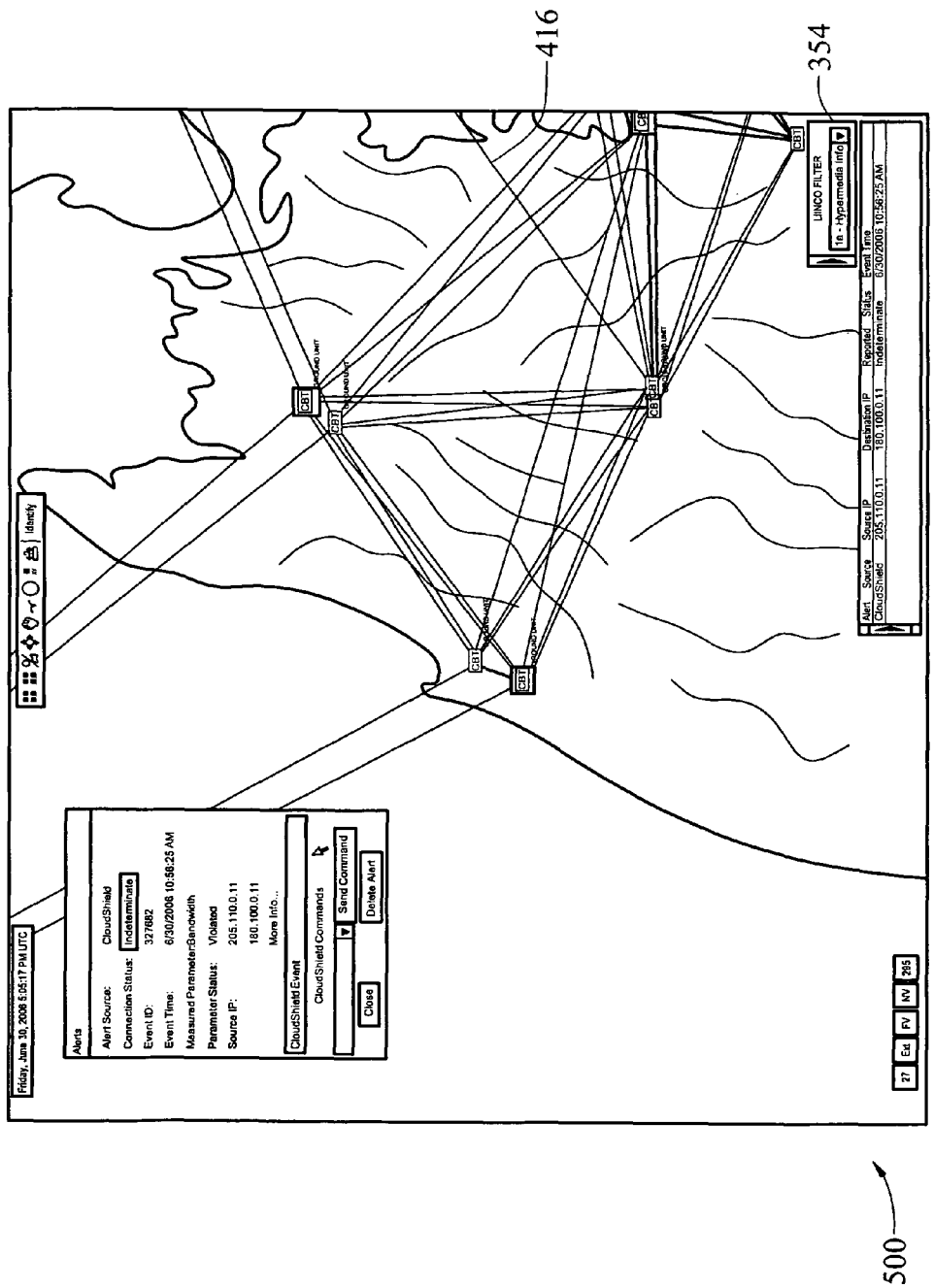

A fourth display in accordance with one implementation of the disclosure is indicated generally in FIG. 8 by reference number 500. The visualization 500 indicates that the link 416 is restored to use and that the LIINCO filter 354 is reconfigured.

In some implementations, the user of the system 20 can select a node in a display of the management system 20 and change a capability level, e.g., a LIINCO level and/or application capability, for the selected node. Such change(s) could be made in various ways, e.g., by activating a window 362 menu and/or capability filter such as the LIINCO filter 354. The management system 20 sends the capability change(s) to the selected node and, in some implementations, to the capability registry 68, as previously described with reference to FIG. 14. In some implementations, the user can make such changes in a 3-D visualization mode, e.g., to evaluate such changes before actually updating the nodes.

A user thus can gain control over available capabilities of ad-hoc nodes, for example, as a node enters the network.

Where a node has a plurality of capabilities, the user can select a different capability based, e.g., on the essentially real-time status of the network as shown in the management system display. Thus the user can influence the operation of the network in essentially real time via displays such as the display 400. Further, in some implementations, the user can implement policy, i.e., rules set for operation of the network, by graphically implementing options available in the management system 20 display. The ability by a user to control node capabilities can provide a high degree of network management flexibility, improved asset utilization, recourse sharing, load leveling, and capability expansion, e.g., by means of application programming interfaces (APIs).

Various implementations of the disclosure can provide a 3-D visualization of all connections of a network, identify any connection problems discovered, and provide supporting diagnostics. The user GUI subsystem 56 provides a pleasant, non-crowded, easy-to-use human interface. The management system 20 provides a high degree of flexibility in planning, testing and demonstrating systems. The foregoing simulation methods make it possible to "warp the problem" in a simulation. For example, a live node that is physically 1,000 miles apart from another node can be simulated as being only a few miles apart from the other node.

Various implementations of the present disclosure provide policy-based network management with self-forming and self-healing capabilities. The foregoing management system provides for interoperability control of ad-hoc nodes in an ad-hoc network. It is possible to view the physical locations of all network assets in an environment. Additionally, nodes not currently in the network but whose identities and capabilities have been identified through capability registration are still recognizable, and controllable, by the system 20 when such nodes reappear in the network.

Mobile and ad-hoc network planning, which support look-ahead to anticipate future asset deployment prediction, are facilitated. Policy management methodologies for traversing information and network management layers of mobile ad-hoc networks can be implemented using the foregoing system. The system 20 can make integrated network management (end-to-end across sub-network boundaries) possible. Further, self-forming communities of interest (CDIs) can be observed, and influenced, in real time.

Various application programming interfaces between COTS tools and the subsystems of the present disclosure make it possible to provide a high level of visibility of network nodes and links. In contrast to other tools currently in use, implementations of the present disclosure can be used to show real-time update of nodes on a network in a 3-D visualization indicating the quality of links. Active network management is facilitated, whereby one can see the quality of connection, including jitter and latency, and link capacity for data.

What is claimed is:

1. A method of managing a network the method comprising:
    displaying, in a pictorial display updated and essentially in real-time, a plurality of live and virtual nodes of a physical network and current geographic locations of each of the nodes, each node having one or more application capabilities registered in a management system for the physical network, and further comprising:
        determining a line of sight exists between a first live node and a first virtual node of the plurality of live and virtual nodes, based on a simulated current geographic position of the first virtual node and a current geographic position of the first live node; and
        displaying a potential link along the determined line of sight between the two nodes that is updated essentially in real-time;
    shadowing a first live node with a first virtual shadow node;
    based on user input, modifying, on the display and on said first virtual shadow node via the physical network, one or more application capabilities, wherein the one or more application capabilities meet at least one mission requirement;
    providing a graphical depiction of network health data of the physical network within the pictorial display, wherein network connections between nodes of the plurality of live and virtual nodes are shown as having one of a plurality of network performance levels within the pictorial display using a respective distinctive visual style; and
    based on user input, modifying, on the display and on said first live node via the physical network, the one or more application capabilities, wherein the one or more application capabilities meet at least one mission requirement;
    the method performed by the management system.

2. The method of claim 1, further comprising:
    monitoring the nodes to determine a current link status of the physical network; and
    modifying the one or more node application capabilities to change the link status.

3. The method of claim 1, wherein the first live node is an ad-hoc node hosted by a live mobile entity displayed on the display.

4. The method of claim 1, wherein the modifying is performed in essentially real time.

5. The method of claim 1, wherein modifying the one or more application capabilities comprises changing a level of interoperability between two or more nodes.

6. The method of claim 1, further comprising simulating a change to an application capability of an ad-hoc node before the modifying.

7. A system for managing a network, the system comprising one or more processors and memory configured to, in a physical simulation using a plurality of ad-hoc live and virtual nodes of a physical network:
    display, in a pictorial display updated essentially in real-time, a depiction of the plurality of ad-hoc live and virtual nodes of the physical network and current geographic locations of each of the nodes, each node having one or more application capabilities registered in a management system for the physical network, and further comprising:
        determining a line of sight exists between a first live node and a first virtual node of the plurality of live and virtual nodes, based on a simulated current geographic position of the first virtual node and a current geographic position of the first live node; and
        display a potential link along the determined line of sight between the two nodes that is updated essentially in real-time;
    based on user input, apply a modification to one or more application capabilities of the first virtual shadow node, wherein the one or more application capabilities meet at least one mission requirement; and
    after applying the modification:
        provide network health data for the physical network;
        provide a graphical depiction of the network health data of the physical network within the pictorial display, wherein network connections between nodes of the plurality of ad-hoc live and virtual nodes are shown as having one of a plurality of network performance levels within the pictorial display using a respective distinctive visual style; and based on user input, apply the modification via the physical network to the first live node.

8. The system of claim 7, the physical network comprising a simulated entity hosting one or more of the virtual nodes, the processors and memory further configured to associate a geographic location of the simulated entity with the one or more hosted virtual nodes.

9. The system of claim 7, wherein the display is further configured to represent the nodes in three dimensions.

10. The system of claim 7, wherein the processors and memory are further configured to:

change one or more links between nodes by changing the application capabilities; and display the one or more changed links.

11. A method of managing a network, the method comprising:

monitoring a physical network including a plurality of live and virtual nodes, each said node of the network having one or more application capabilities, each said application capability being associated with one of a plurality of information interoperability levels predefined for the network and each said application capability meeting at least one mission requirement provided by each said node, the monitoring performed to detect an entry by a live ad-hoc node into the network, the live ad-hoc node shadowed by a virtual shadow node;

displaying, in a pictorial display, the live ad-hoc node relative to a geographical location of the live ad-hoc node and associated with the virtual shadow node, further comprising:

determining a line of sight exists between the live ad-hoc node and a virtual node of the live and virtual nodes, based on the geographical location of the live ad-hoc node and a simulated current geographical location of the virtual node; and displaying a potential link along the determined line of sight between the two nodes that is updated essentially in real-time;

based on user input, modifying one or more of the application capabilities of the virtual shadow node via the physical network to define one or more modified application capabilities;

providing a graphical depiction of network health data of the physical network within the pictorial display, wherein network connections between nodes of the plurality of live and virtual nodes are shown as having one of a plurality of network performance levels within the pictorial display using a respective distinctive visual style; and after the providing and based on user input, modifying the one or more application capabilities of the live ad-hoc node in accordance with the one or more modified application capabilities of the virtual shadow node;

the method performed by a management system operating as a virtual node of the physical network.

12. The method of claim 11, further comprising providing behavior of the virtual shadow node after the modifying of the one or more application capabilities of the virtual shadow node, the behavior provided before modifying the one or more application capabilities of the live ad-hoc node.

13. The method of claim 11, further comprising, via the network and the display, discovering and changing one or more of the interoperability levels of the virtual shadow node in relation to another node of the physical network.

14. The method of claim 13, wherein changing the one or more interoperability levels comprises the modifying of the one or more application capabilities of the virtual shadow node.

15. The method of claim 13, wherein discovering the one or more of the interoperability levels comprises discovering an applications capability of the live ad-hoc node.

16. The method of claim 11, further comprising matching an identification of one of the virtual nodes with a mobile host entity identification to geographically locate the virtual node.

17. The method of claim 11, performed in a physical simulation using the nodes.

18. The method of claim 11, further comprising referring to a previous registration of the interoperability levels for the entering ad-hoc node in a registry of the management system.

19. A method of managing a communications network, the method comprising:

through the network, determining a substantially current geographical location of a live ad-hoc node and of a virtual shadow ad-hoc node shadowing the live ad-hoc node;

displaying, substantially in real time via a graphical user interface, a representation of the ad-hoc nodes relative to their determined geographical location;

determining a line of sight exists between the virtual shadow ad-hoc node and one of a plurality of live and virtual nodes in the network, based on a current simulated geographic position of the virtual ad-hoc node and a current geographic position of the one of the plurality of live and virtual nodes;

displaying a potential link along the determined line of sight between the two nodes that is updated substantially in real-time;

receiving via the graphical user interface a user selection of one of a plurality of application capabilities of the virtual shadow ad-hoc node; and modifying, on the live ad-hoc node, an application capability corresponding to the selected application capability of the virtual shadow ad-hoc node, wherein the selected application capability meets at least one mission requirement;

the method performed by a management system for managing the communications network, the management system included in a virtual node user-operated to emulate a live node of the communications network.

20. The method of claim 19, further comprising:

simulating a second live ad-hoc node as being physically present at a geographic location different from its physical geographic location; and displaying the second live ad-hoc node relative to its simulated geographic location.

21. The method of claim 19, wherein the representation of the ad-hoc nodes is of a three dimensional space.

22. The method of claim 19, wherein the ad-hoc nodes further include one or more constructive nodes comprising a software emulation of a communication device under control of a human.

23. The method of claim 19, further comprising determining and displaying, in the representation, states of links between the ad-hoc nodes.

24. The method of claim 19, wherein a plurality of levels of information interoperability represent a plurality of node applications capabilities.

25. The method of claim 24, further comprising:

receiving via the graphical user interface a user selection of one of the displayed ad-hoc nodes;

changing an information interoperability level of the user-selected ad-hoc node in accordance with user input; and
displaying the change on the graphical user interface.

26. The method of claim 19, wherein the communications network includes a physical simulation network.

27. A method of managing a network, the method comprising:
obtaining essentially real-time information describing a plurality of ad-hoc nodes of a physical simulation network including a live ad-hoc node and a virtual shadow ad-hoc node shadowing the live ad-hoc node, the essentially real-time information including, for each node, a node identity, node geographical location, and one or more applications capabilities of the node relative to the network, each capability associated with a predefined level of node interoperability;
using the essentially real-time information to display the ad-hoc nodes in a three-dimensional geographical representation and in essentially real time on a graphical user interface, comprising:
determining a line of sight exists between a first live node and a first virtual node of the plurality of live and virtual nodes, based on a simulated current geographic position of the first virtual node and a current geographic position of the first live node; and
displaying a potential link along the determined line of sight between the two nodes that is updated essentially in real-time;
receiving via the graphical user interface a user selection of one of the applications capabilities of the virtual shadow ad-hoc node, and modifying the selected applications capability of the virtual shadow ad-hoc node in response to user input, wherein the selected application capability meets at least one mission requirement;
providing network health data after the modifying;
providing a graphical depiction of the network health data within the pictorial display, wherein network connections between nodes of the plurality of live and virtual nodes are shown as having one of a plurality of network performance levels within the three-dimensional geographical representation on the graphical user interface using a respective distinctive visual style; and
in response to user input after the providing, modifying one or more applications capabilities of the live ad-hoc node;
the method performed by a management system for managing the physical simulation network, the management system included in a virtual node user-operated to emulate a live node of the physical simulation network.

28. The method of claim 27, wherein using the essentially real-time information to display the ad-hoc nodes comprises translating geographic positioning data received from a live one of the ad-hoc nodes to distributed interactive simulation (DIS) data.

29. The method of claim 27, further comprising displaying links between the nodes in the three-dimensional geographical representation.

30. The method of claim 27, further comprising:
maintaining a registry of capabilities of the nodes; and
using the registry to identify a node re-entering the network.

31. The method of claim 27, further comprising managing at least one constructive node formed entirely by software emulation of a communication device under control of a human.

32. The method of claim 27, further comprising:
determining a health status of one or more links between the nodes; and
displaying the one or more links and the health status in the three-dimensional geographical representation.

33. The method of claim 27, further comprising simulating a second live ad-hoc node as having a simulated geographic location different from its physical geographic location;
the representation of the ad-hoc nodes including the second live ad-hoc node displayed relative to its simulated geographic location.

34. A system for managing a communications network, the system comprising:
one or more processors and one or more memory components user-operated to emulate a live node of a physical simulation network to determine substantially current geographical locations of a plurality of ad-hoc nodes of the physical simulation network, the ad-hoc nodes including a live node and a virtual shadow node configured to shadow the live node; and
a display configured to display, essentially in real time, a pictorial representation of the ad-hoc nodes relative to their current geographical locations;
the one or more processors and one or more memory components further configured to:
receive via the display one or more user-selected applications capabilities common to the live and shadow nodes, wherein the one or more user-selected application capabilities meet at least one mission requirement;
in response to user input, applying a change to the one or more selected applications capabilities on the shadow node, and provide network health data after the changing;
in response to user input, applying the same change to the one or more selected applications capabilities on the live node;
determine a line of sight exists between a first live node and a first virtual node of the plurality of live and virtual nodes, based on a simulated current geographic position of the first virtual node and a current geographic position of the first live node; and
display a potential link along the determined line of sight between the two nodes that is updated essentially in real-time; and
provide, via the display, a graphical depiction of network health data of the physical simulation network within the pictorial display, wherein network connections between nodes of the plurality of ad-hoc nodes of the physical simulation network are shown as having one of a plurality of network performance levels using a respective distinctive visual style.

35. The system of claim 34, wherein the one or more processors and the one or more memory components are configured to determine one or more current capabilities of the ad-hoc nodes at a user-selected level of information interoperability, and the display is configured to display the current capabilities.

36. The system of claim 34, wherein the physical simulation network is geographically distributed.

37. The method of claim 1, wherein the first virtual node comprises the first virtual shadow node, and further comprising:
simulating the current geographic position of the first virtual shadow node essentially in real-time.

38. The method of claim 37, wherein displaying, in the pictorial display updated essentially in real-time, the plurality of live and virtual nodes of the physical network and current geographic locations of each of the nodes further comprises:
upon determining that the line of sight between two nodes of the plurality of live and virtual nodes has been lost, based on a respective current geographic position of each of the two nodes, updating the pictorial display essentially in real-time to remove the displayed potential link along the determined line of sight.

39. The method of claim 1, wherein the at least one mission requirement is selected from at least one of firing weapons, tracking data and jamming network traffic.

\* \* \* \* \*